United States Patent [19]

Chauvel

[11] 4,240,138
[45] Dec. 16, 1980

[54] SYSTEM FOR DIRECT ACCESS TO A MEMORY ASSOCIATED WITH A MICROPROCESSOR

[75] Inventor: Gerard Chauvel, Cagnes-sur-Mer, France

[73] Assignee: Texas Instruments Incorporated, Dallas, Tex.

[21] Appl. No.: 948,284

[22] Filed: Oct. 3, 1978

[51] Int. Cl.³ .............................................. G06F 3/00
[52] U.S. Cl. .................................................. 364/200
[58] Field of Search ....................................... 364/200

[56] References Cited

U.S. PATENT DOCUMENTS

| 3,665,415 | 5/1972 | Beard et al. | 364/200 |
|---|---|---|---|
| 3,800,287 | 3/1974 | Albright | 364/200 |
| 3,949,375 | 4/1976 | Ciarlo | 364/200 |
| 3,986,170 | 10/1976 | Valassis et al. | 364/200 |
| 3,990,055 | 11/1976 | Henderson et al. | 364/200 |
| 4,055,851 | 10/1977 | Jenkins et al. | 364/200 |
| 4,067,059 | 1/1978 | Derchak | 364/200 |
| 4,075,691 | 2/1978 | Davis et al. | 364/200 |
| 4,079,452 | 3/1978 | Larson et al. | 364/200 |
| 4,099,236 | 7/1978 | Goodman et al. | 364/200 |

OTHER PUBLICATIONS

Bounds; Peter, "Buffering High Speed Data for Minicomputer Input", Computer Design, Jul. 1973, pp. 69–73.

Primary Examiner—Errol A. Krass
Attorney, Agent, or Firm—Melvin Sharp; N. Rhys Merrett; Gary C. Honeycutt

[57] ABSTRACT

System for direct access to a memory associated with a microprocessor data processing device comprising a direct access interface for introducing or extracting data in the memory during interruptions of the connection between the processing device and the memory, and a buffer interface operable during a portion of the access time of the processing device to the memory, to supply data addresses contained in the memory originating from the processing device and to enable circulation of corresponding data between the processing device and the memory, and during the remainder of the access time of the processing device, to the end of the access time, to store data transferred from the memory and to prevent transmission of data to the memory. A logic circuit controls inhibition of the buffer interface or of the direct access interface and, during the periods of inhibition of the buffer interface, permits the circulation of data and of addresses between the direct access interface and the memory.

2 Claims, 9 Drawing Figures

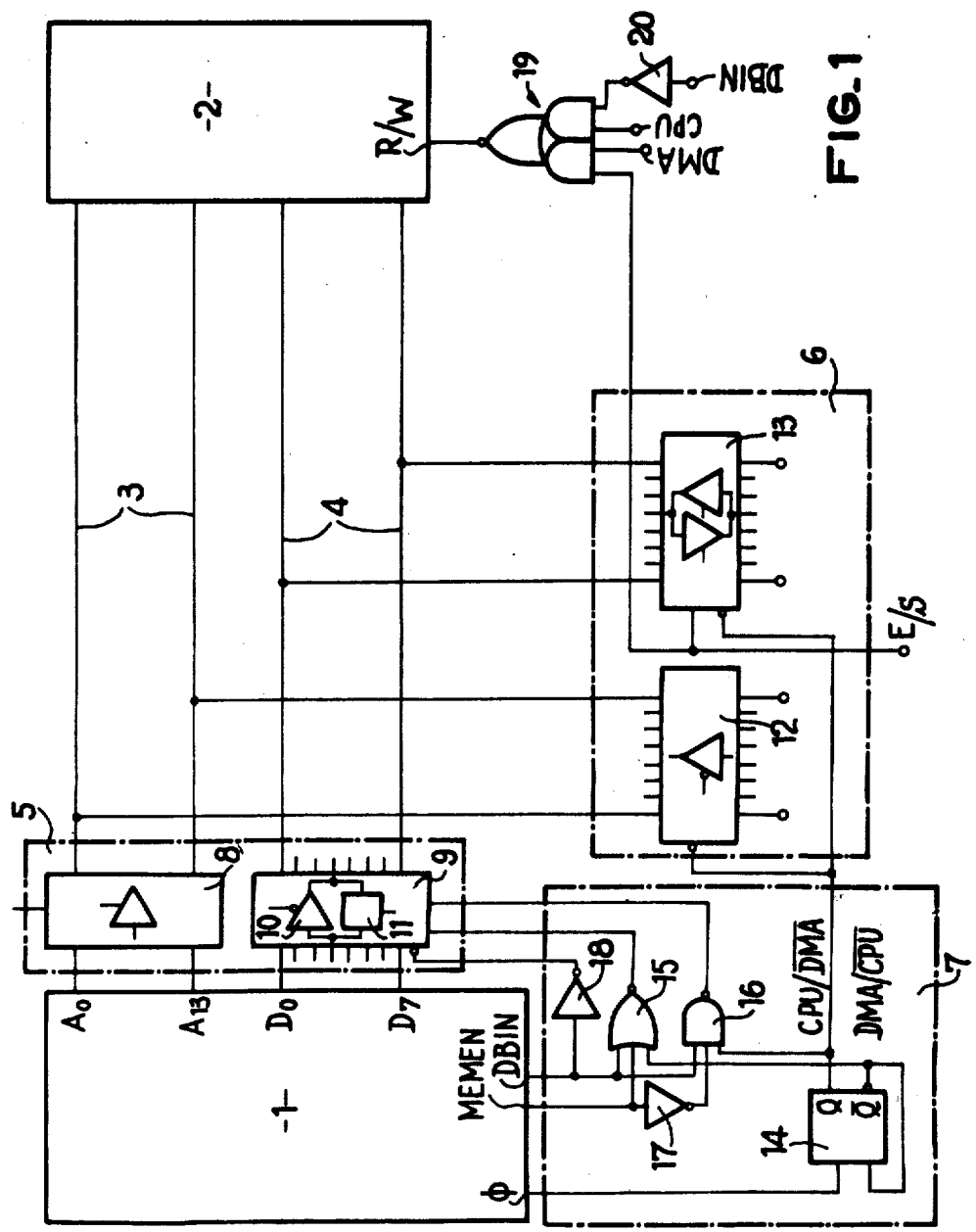

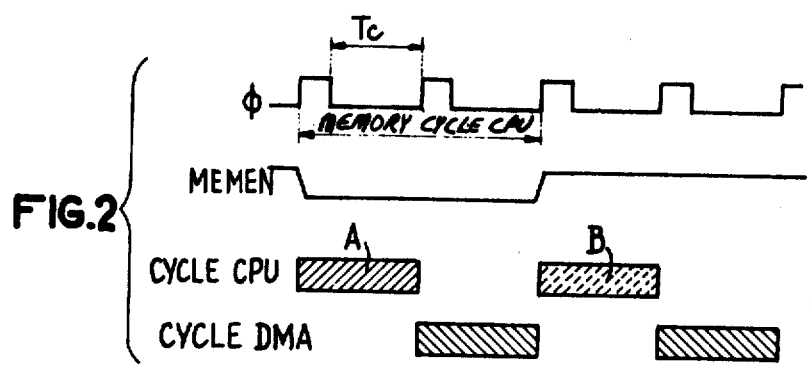
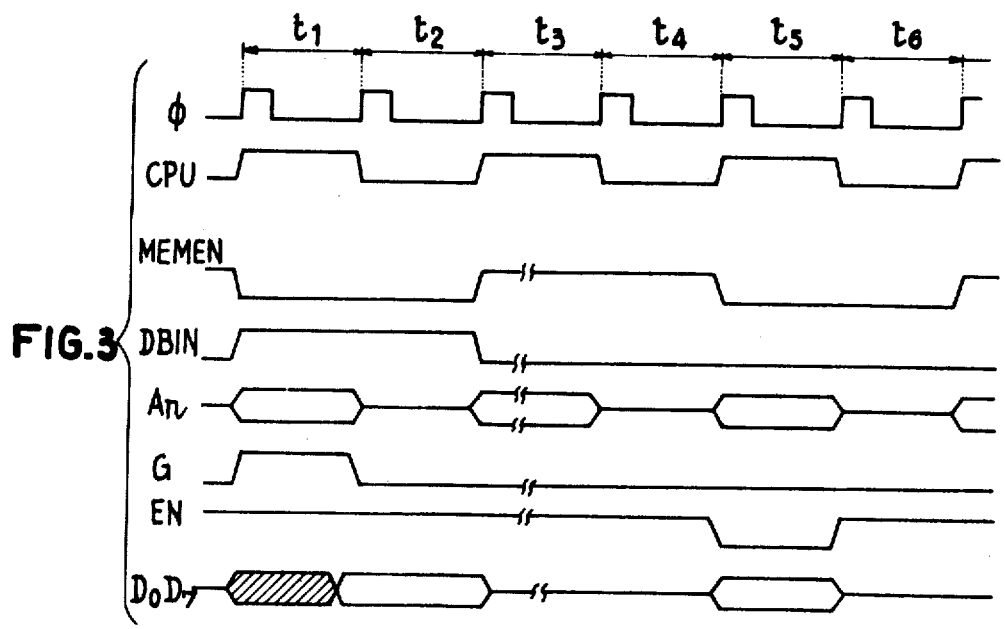
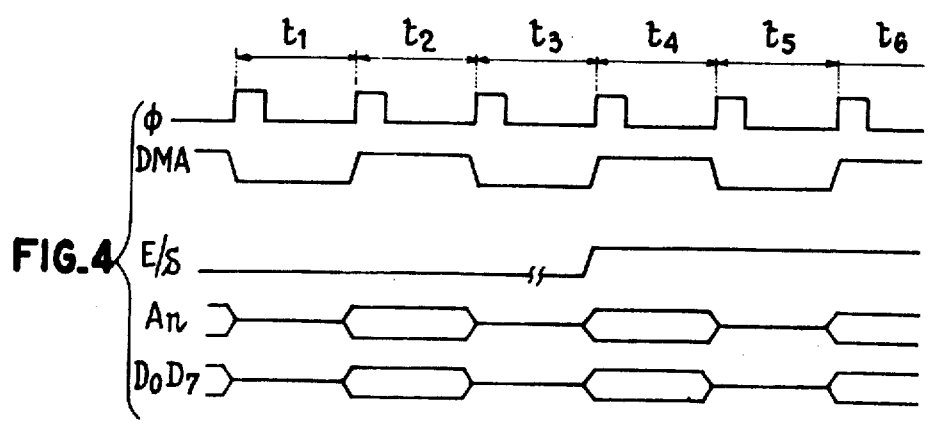

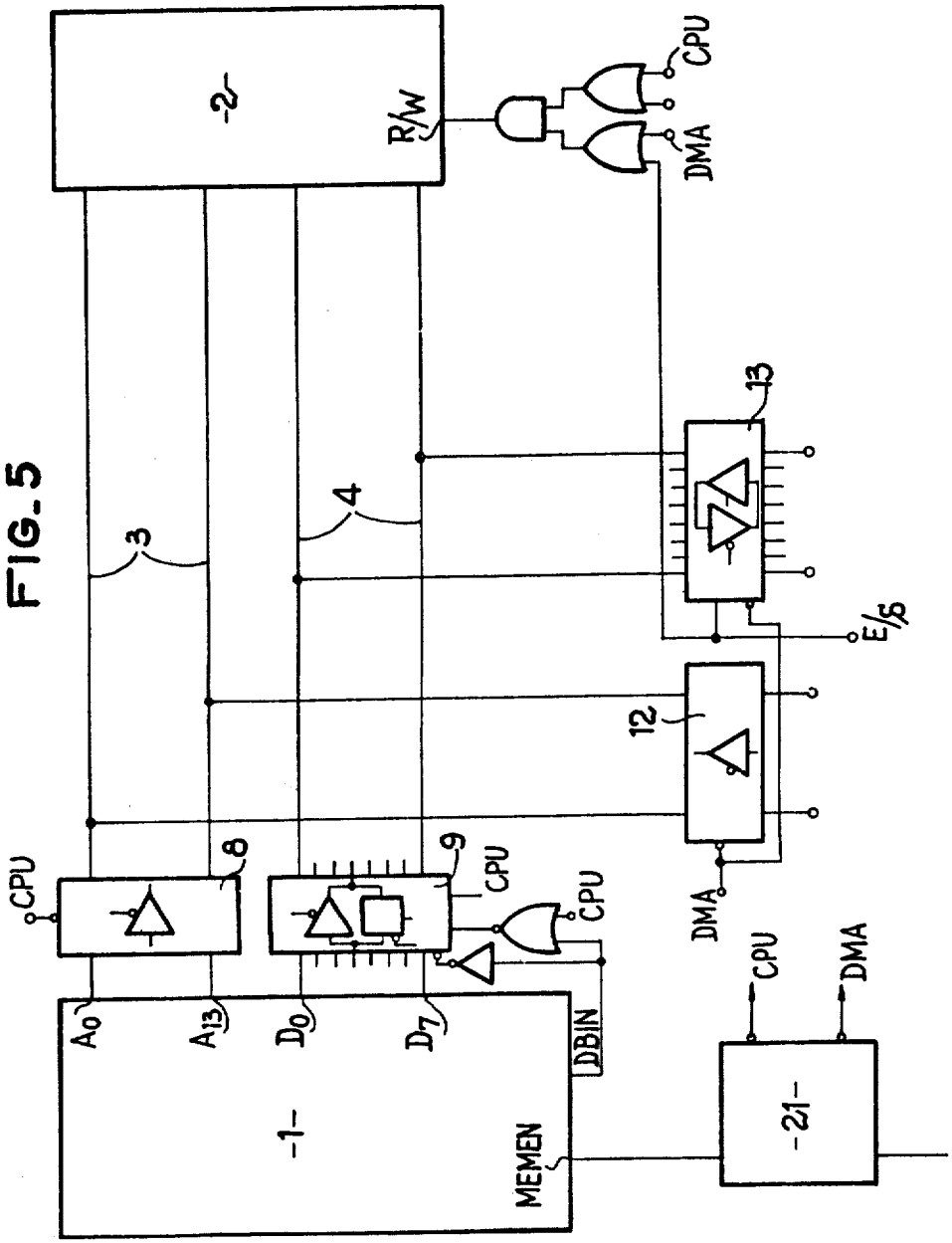

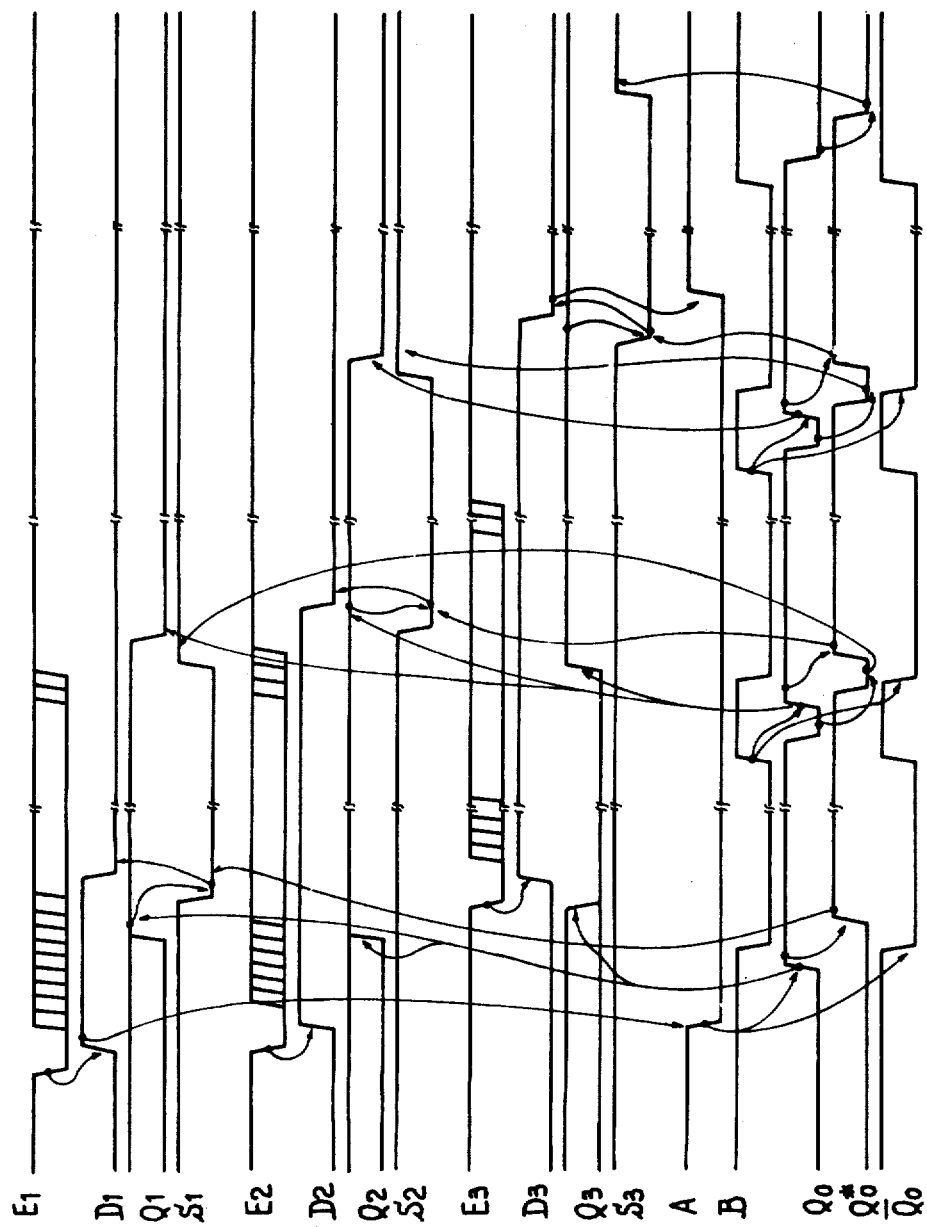

SYSTEM FOR DIRECT ACCESS TO A MEMORY ASSOCIATED WITH A MICROPROCESSOR

The present invention concerns devices for direct access to a memory associated with a data processing device such as a microprocessor or the like.

Some processes and devices for transferring data between a microprocessor and a peripheral circuit are known.

Devices which use microprocessors are relatively slow.

In some applications, it is necessary to transfer a large amount of data, for example, to load a portion or even all of the dynamic memory of a microprocessor with data coming from a mass memory. The busy time of a microprocessor with such loads, whether serial or other, is relatively long, of the order of 10 to 20 ms to assure the loading of 1,024 words.

Loading by direct access to the memory permits freeing the microprocessor of this task and the duration of the exchanges is then directly a function of the operating speed of the memory. A known process of direct access to the memory associated with a microprocessor is a process of access in hold in the floating state mode. This process utilizes the possibility of suspending the activities of the microprocessor and of causing the outputs thereof to pass to the high impedance state. It is then possible to replace the data which should have come from the microprocessor by data coming from the system of direct access to the memory. This direct access process, however, has the disadvantage of causing the stopping of the operation of the microprocessor during the operations of direct access to the data to the memory associated with it.

The invention aims to remedy the aforesaid disadvantage by creating a direct access system which gives access to the memory associated with a data processing device without disturbing the operation of this device.

The invention relates, therefore, to a system for direct access to a memory associated with a data processing device comprising a direct access interface for introducing or extracting data in the memory during the interruptions of the connection between the processing device and the memory. The system includes a buffer interface having the capability during a portion of the access time of the processing device to the memory, to furnish stored data addresses from the memory of the processing device, and to assure the circulation of the corresponding data between the processing device and said memory, and during the rest of the access time of the processing device to the memory, to store, until the end of the access time, data arriving from the memory and to prevent the circulation of data toward said memory, and logic means for controlling the inhibition of the buffer interface or of the direct access interface and, during the buffer interface inhibition intervals, to permit the circulation of the data and of the addresses between the direct access interface and the memory.

Other characteristics of the invention will appear in the course of the description which follows, made with reference to the annexed drawings, given only by way of example, and in which:

FIG. 1 is a block diagram of a direct access system of the so-called synchronous type with a memory associated with a microprocessor in accordance with the invention;

FIG. 2 is a diagram as a function of time illustrating the operation of the system of FIG. 1;

FIGS. 3 and 4 are diagrams as a function of time representing respectively the access to the memory of the microprocessor and the direct access interface of the system of FIG. 1;

FIG. 5 is a block diagram of a direct access system of the so-called asynchronous type, with a memory associated with a microprocessor;

FIG. 9 is a diagram as a function of time illustrating the operation of three channels of the device.

Figure 6:
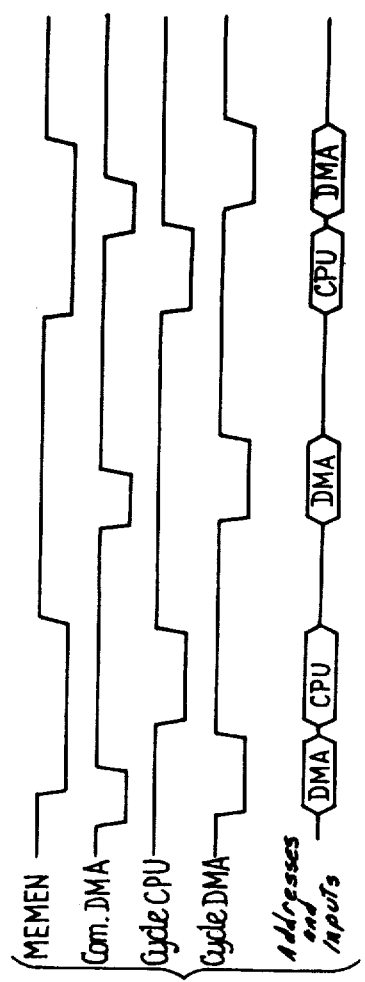
FIG. 6 is a diagram illustrating the operation of the system of FIG. 5.

The system shown in FIG. 1 comprises essentially a data processing device 1 which in the present example is a microprocessor of type TMS 9980. Associated with this microprocessor is a memory 2 connected to the microprocessor by address bus lines 3 and data bus lines 4. The memory 2 comprises a read/write memory, suitably of type TMS 4045-25, to which it is important to have access directly, and a read only memory, suitably of type TMS 2716. Between the microprocessor and the memory, a buffer interface 5 is interposed. This basic system is described in more detail in TMS 9900 Microprocessor Data Manual, Engineering Staff of Texas Instruments Incorporated, May 1976.

To the address and data inputs of the memory 2 are connected also the address and data outputs of a direct access interface 6.

The assembly thus described has an associated logic control circuit 7 connected to the microprocessor 1, to the buffer interface 5 and to the direct access interface 6. The buffer interface 5 comprises a three-state circuit 8 connected to the address lines 3. In the present example, this circuit is of type LS 241. The interface 5 comprises further, inserted in the data bus lines 4, a data circuit 9 consisting of a three-state circuit 10 and a buffer memory 11 connected head-to-tail. The three-state circuit 10 is for example of type LS 241, while the buffer memory is of type LS 373.

The direct access interface 6 comprises, as in the buffer interface, a three-state circuit 12 whose outputs are connected to the address bus lines 3, between the three-state circuit 8 and the memory 2, and a data circuit 13 whose outputs are connected to the data bus lines 4, between circuit 9 and memory 2. The three-state circuit 12 is for example of type 241, while the circuit 13 is of type LS 245.

The control circuit 7 comprises a flip-flop 14 connected to the clock output $\phi$ of the microprocessor 1 and operable to divide by two the clock frequency thereof.

This flip-flop 14, which is for example a LS 74 device has a Q output connected to the enabling input of the circuits 12 and 13 of the direct access interface 6, while its $\overline{Q}$ output functions to control the buffer interface 5. To this end, the $\overline{Q}$ output of flip-flop 14 is connected to a first input of a NOR gate 15, a second input of which is connected to the memory enabling output MEMEN of the microprocessor 1, and a third input of which is connected to an output DBIN determining the direction of the data flow on the data bus lines 4. The output of gate 15 is connected to an input of circuit 9 of interface 5.

The Q output of the flip-flop 14 is further connected to one input of a NAND gate 16, another input of which is connected to the memory enabling output MEMEN of the microprocessor by an inverter 17 and a third input of which is connected to the output DBIN determining the data flow direction. The output of gate 16 is connected to a corresponding input of circuit 9 of the buffer interface 5.

Lastly the output DBIN of the microprocessor is connected to a third input of circuit 9 through an inverter 18.

The memory 2 has a control input coupled with the control input of circuit 13 of the direct access interface through a gate assembly 19 which receives in addition the signals of direct access to the memory DMA, of cycle of the microprocessor CPU and the signal DBIN inverted by an inverter 20.

The operation of the device of FIG. 1 will be described in reference to FIGS. 2, 3 and 4.

In the course of a direct access to the memory 2 from the interface 6, the microprocessor 1 operates normally and its outputs are blocked at the level of the buffer interface 5. Circuit 11 of the buffer interface 5 retains the last output of memory 2.

When microprocessor 1 uses memory 2, it is the direct access interface 6 which is at high impedance, i.e. temporarily isolated from memory 2.

The two interfaces 5 and 6 thus act as a multiplexer between the microprocessor 1 and a system (not shown) connected to the direct access interface 6. The control of the interfaces is assured by the control circuit 7.

The sharing of the memory time between the microprocessor 1 and the direct access interface 6 is represented in FIG. 2. In a classic system, the microprocessor 1 uses memory 2 as long as the memory enabling signal MEMEN is at low level, i.e. during two cycle times TC of the microprocessor. In a device embodying the invention, it can be seen in FIG. 2 that a single cycle time TC is reserved to the microprocessor 1 (cycle CPU) while the following cycle time (cycle DMA) is assigned to the direct access interface 6. For the correct operation, the cycle time of memory 2 in the WRITE or READ mode must be less than TC. It is seen that the CPU cycle B reserved for the microprocessor is not carried out as the signal MEMEN is then at high level.

The CPU cycle for the microprocessor (FIG. 3) is defined when the output Q of flip-flop 14 is at high level (Q=1). The period $\overline{Q}=1$ defines the DMA cycle for the direct access interface (FIG. 4). The multiplexing of the addresses CPU and DMA is assured directly by the output signals of flip-flop 14.

As to the multiplexing of the data, it is assured as follows.

During the DMA cycle of direct access to the memory, circuit 13 of interface 6 is enabled, while the direction of the data moving on the buslines 4 is determined by the input E/S (FIG. 4). During a microprocessor access cycle CPU, the outputs $D_0$ to $D_7$ thereof are connected to the data bus lines 4 through the three-state circuit 10 or through the buffer memory 11. When the memory is used by the microprocessor as shown in the diagram of FIG. 3, the periods $t_1$, $t_3$, $t_5$ of the clock signal $\phi$ are reserved for the microprocessor.

During the periods $t_1$, $t_2$, the microprocessor is in READ cycle as the memory enabling signal MEMEN is in zero state and signal DBIN for determination of the direction of the data is equal to 1. The addresses which select a word in the memory are enabled only during the period $t_1$ and the data are then stored in the buffer memory 11, and then presented on the inputs $D_0$ to $D_7$ of microprocessor 1 as long as the signal DBIN is at high level.

In the course of period $t_3$, memory 2 is not energized. During the periods $t_5$ and $t_6$, the memory enabling signal MEMEN is equal to zero, as is the signal DBIN. The microprocessor is then in WRITE cycle. However, the data appearing at the terminals $D_0$ to $D_7$ are transferred into the memory only during the clock period $t_5$. As the diagram of FIG. 4 shows, the clock periods $t_2$ and $t_4$ are reserved for direct access to the memory. During the period $t_2$, the input E/S being at low level, the data moves from the memory to a user device (not shown) through circuit 13 of interface 6. During the period $t_4$, the input E/S is at a high level and the transfer is assured in the reverse direction, that is, from interface 6 to memory 2. The R/W signal which is the output signal of the gate assembly 19 is conditioned by the signal DBIN from the microprocessor 1 and by the signal E/S from the user device (not shown).

It is seen, therefore, that the performances of the device of FIG. 1 are linked directly with the cycle time of the microprocessor as the sharing of use time of the memory is controlled directly from the clock signal $\phi$ of the microprocessor.

In an arrangement of this kind, the evolution of the dynamic parameters of the various components cannot be utilized to improve the overall performances of the system. Besides, the microprocessor clock and that of the circuit of direct access to the memory must be synchronous, so that the application of the device is limited by the nature of the clock equipping the device whose data must have direct access to the memory associated with the microprocessor.

The block diagram of FIG. 5 shows a direct access system of the so-called asynchronous type whereby the system of FIG. 1 can be further perfected. The parts common to this system and to that of FIG. 1 are designated by the same reference numbers and will therefore not be described further. The asynchronous system of FIG. 5 differs from the foregoing system essentially in that it comprises an asynchronous logic control circuit 21 shown in detail in FIG. 7 which will now be described.

This circuit comprises three essential parts, namely a circuit 22 for preliminary storage of access requests connected to a circuit 23 for storage of access requests in progress, this circuit being in turn connected to a priority logic 24.

In the embodiment shown, the logic control circuit is a three channel circuit. It permits, therefore, the handling of three access channels, for example, (a) the microprocessor 1, (b) writing in the dynamic memory of memory 2 at a certain frequency and (c) reading at another frequency. There is no phase relation between the three channels. The outputs of the circuits 22a, 22b, 22c are connected to the inputs of a NOR gate 25 whose output is connected to an input 4 of a monostable circuit 26. The output $Q_0$ of the monostable circuit is connected, on the one hand, to circuits 23a, 23b, 23c, for storage of access requests in progress of each channel, and on the other hand, through a delay element 27, to an input of each of three NAND gates 24a, 24b, 24c constituting the three channels of the priority logic 24.

Gate 24a is a gate with two inputs whose input other than that connected to the monostable circuit 26 is connected to a first output of circuit 23a. Gate 24b is a gate with three inputs whose two inputs other than that connected to the monostable circuit 26 are respectively connected, one to a second output of circuit 23a, the other to a first output of circuit 23b. Gate 24c is a gate with four inputs whose inputs other than that connected to the monostable circuit 26 are each connected to an output of the circuits 23a, 23b, 23c. The circuit thus formed registers the requests for access to the memory and distributes them in the order of arrival or a priority order.

Figure 8:
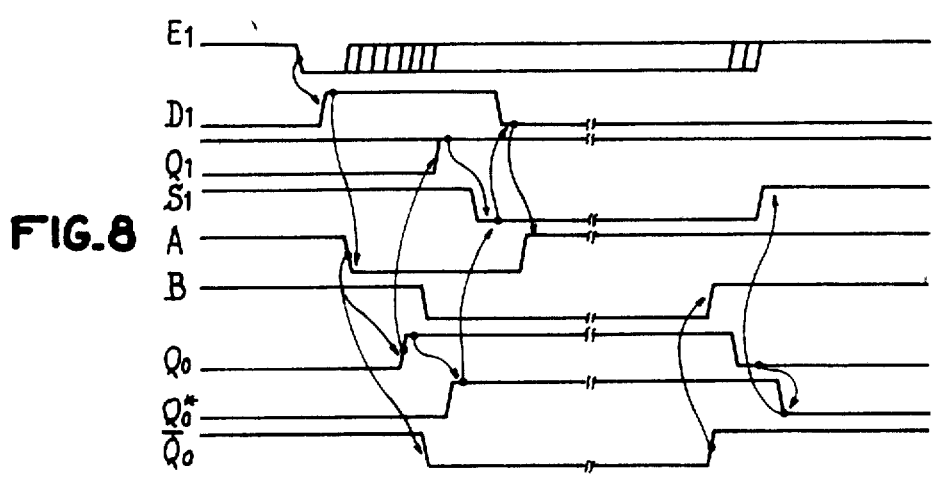
FIG. 8 is a diagram as a function of time illustrating the operation of one channel of the system of FIG. 5.

Channel $E_1S_1$, which has the highest priority is used for the microprocessor. Its operation will now be described with reference to the diagram of FIG. 8.

When the input $E_1$ is brought to the low level, flip-flop 22a changes state so that the input $D_1$ of circuit 23 switches to 1, thereby effecting the change of state of input A of the monostable circuit 26 and causing the appearance of a pulse at the output $Q_0$ thereof since its input B, which is at the high level, permits it. The rising leading edge of signal $Q_0$ is used to register the access request in the D-type flip-flop 23a whose output $Q_1$ changes to the high level.

The combination $\overline{Q_1 \cdot Q_0^*}$ appearing at the inputs of gate 24a allows the appearance of a pulse on the output $S_1$. When $S_1$ is at the low level, the flip-flop 22a is reset to its initial state. The input A of the monostable circuit 26 is again at the high level. The duration of pulse $Q_0$ is determined by a network RC connected to the monostable circuit 26. At the end of the pulse, output $Q_0$ is at the low level and $Q_0^*$ again causes output $S_1$ to pass to the high level and the transition from $Q_0$ to the input B does not affect the monostable 26 because the input A thereof is at the high level.

Figure 7:
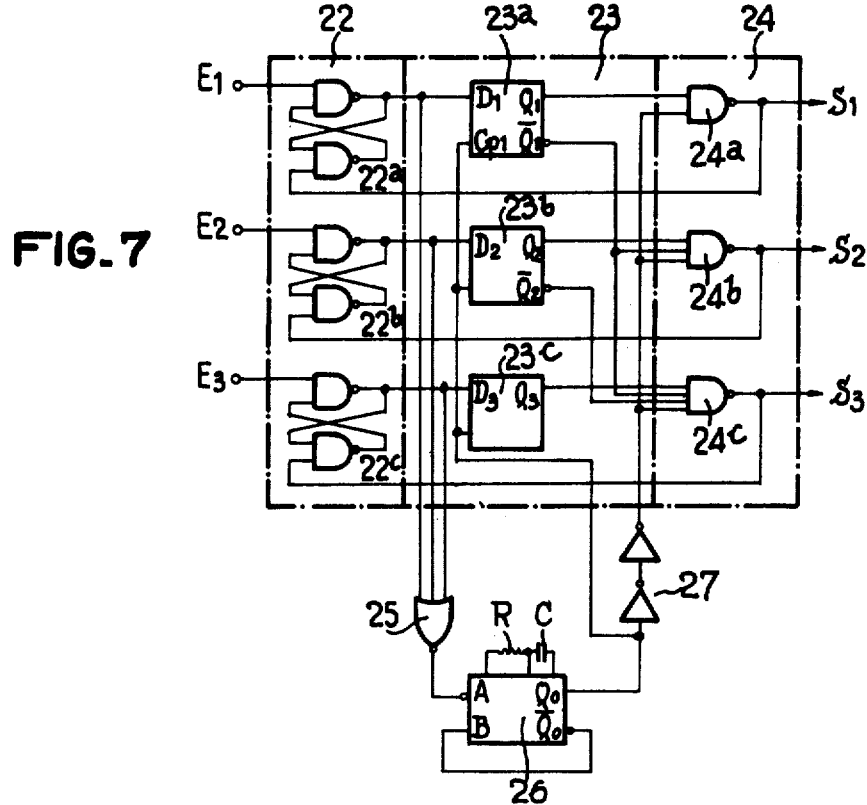
FIG. 7 is a detailed diagram of a logic circuit controlling the system of FIG. 5.

FIG. 9 shows an example of operation of the three channels of the logic control circuit of FIG. 7. Input $E_1$ is the first to be brought to the low level. Pulse $S_1$ is generated as described in reference to FIG. 8. Input $E_2$ is brought to the low level immediately after $E_1$. Input $D_2$ of circuit 23b is brought to the high level and as soon as pulse $Q_0$ is generated by the negative transition on input A of the monostable circuit 26, $D_1$ and $D_2$ are then registered in the D-type flip-flops 23a and 23b. The combination $\overline{Q_1 \cdot Q_0^*}$ permits, as before, generation of a pulse at output $S_1$. However, transmission of pulse $Q_0^*$ toward output $S_2$ cannot take place because $\overline{Q_1}=0$. During pulse $Q_0$, the input $E_3$ is brought to the low level, RF flip-flop 22c changes state, and input $D_3$ of flip-flop 23c assumes a 1 state. This transition has no effect on the monostable 26 because the input A thereof is already at low level.

At the end of the pulse generated at output $S_1$, the input A of the monostable 26 is still at the low level, the output $\overline{Q_0}$ thereof, which is looped back to its input B, permits generation of a new pulse which registers the states $D_1$, $D_2$, $D_3$, in the respective flip-flops 23a, 23b, 23c. The outputs $Q_2$ and $Q_3$ of the flip-flops 23b and 23c are at the high level, but the same priority system is valid for the outputs S2 and S3 as for the outputs $S_1$ and $S_2$. Consequently the signal $S_2$ is generated with priority over signal $S_3$.

The operation of output $S_3$ is identical with that of output $S_2$. The latter output always has the lowest priority.

This three channel control circuit permits the use of memories whose cycle time is slightly shorter than that of the microprocessor because upon negative transition of the memory enabling signal MEMEN, if a cycle is being executed at that moment, the pulse at the output $S_1$ of the first channel of the logic control circuit can be delayed by only one cycle time and in all cases the data will be available before the end of the signal MEMEN.

The operation of the device of FIG. 5 is illustrated by the diagram of FIG. 6. In this figure, the first signal "COM. DMA" arrives before the memory enabling signal MEMEN from the microprocessor. In view of the operation of the circuit of FIG. 7, which first grants priority to the earliest signal arriving at its inputs, the direct access cycle "DMA" is executed with priority. It is immediately followed by the CPU cycle of the microprocessor. The second signal "COM. DMA" is isolated; the cycle DMA is generated immediately. Finally, in the last case corresponding to the group of signals situated on the right of FIG. 6, the microprocessor (CPU) is seen to have priority. When two signals overlap, the asynchronous logic circuit removes the uncertainty and gives priority to the first received signal. The memory scanning cycles rank in their order of arrival. Using the same principle, the number of access channels to the address and data bus lines can be brought to a value higher than 3. There must then be added to the device of FIG. 7 a logic which gives the highest priority to the cycle CPU of the microprocessor.

The two direct access devices just described have different applications. The device of FIG. 1 or synchronous type direct access device permits access to the memory associated with a microprocessor at regular intervals of time, in synchronism with the microprocessor clock. With it, for example, a display can be used.

The asynchronous direct access device of FIG. 5 permits obtaining access to the memory at any time without any phase relation with the microprocessor clock. Such a device is much more flexible than the foregoing. While in the present example the device has only one microprocessor and one direct access interface, it is understood that the asynchronous direct access device can be applied to a larger number of microprocessors and direct access interfaces.

The components whose specifications are given in the above description are all manufactured and sold by Texas Instruments Incorporated.

What we claim is:

1. A data processing system comprising:
    memory means for providing the contents of memory locations therein a predetermined response time after receiving the location addresses thereof;
    data processing means for providing, during a first memory access period, a primary access control signal and a first memory location address, and for receiving, during a consecutive, second memory access period, the contents provided by the memory means in response thereto, the first and second memory access periods being at least equal to the response time of the memory means;
    buffer interface circuit means for
        applying, in an enabled condition, a memory location address provided by said data processing means to said memory means and for receiving the contents provided by the memory means in response thereto, and for providing, in a disabled condition, the received contents to the data processing means;
    direct access interface means for applying, in an enabled condition, a received second memory location address to the memory means, and for receiving and providing, in the enabled condition, the contents provided by the memory means in response thereto; and data flow control means for receiving the primary access control signal and an asynchronous, secondary access control signal, for enabling only said direct access interface means for at least said response time in response to receiving only the secondary access control signal, and for enabling said buffer interface means for at least said response time in response to receiving the primary access control signal.

2. A system according to claim 1, wherein said data flow control means comprises:
   a first channel control for receiving and registering the primary access control signal;
   a second channel control for receiving and registering the secondary access control signal; and
   a priority control for enabling said direct access interface means for at least said response time if only a secondary access control signal is registered, the registration being reset thereafter, and for enabling the buffer interface means for at least said response time if a primary access control signal is registered, the registration being reset thereafter.

* * * * *